Feb. 13, 1951   J. J. CURRY   2,541,043
MIXING APPARATUS
Filed Nov. 23, 1946   2 Sheets-Sheet 1

INVENTOR.
John J. Curry
BY
Caesar and Rivise
Attorneys

Feb. 13, 1951 J. J. CURRY 2,541,043
MIXING APPARATUS
Filed Nov. 23, 1946 2 Sheets-Sheet 2

INVENTOR.
John J. Curry
BY
Caesar and Rivise
Attorneys

Patented Feb. 13, 1951

2,541,043

UNITED STATES PATENT OFFICE 2,541,043

MIXING APPARATUS

John J. Curry, Philadelphia, Pa.

Application November 23, 1946, Serial No. 712,035

6 Claims. (Cl. 259—13)

This invention relates to mixing apparatus, and has particular reference to devices of the type for the preparation of intimate admixtures of ingredients for dental or medical use.

The apparatus of the invention lends itself particularly for use by dentists in the preparation of dental amalgams, and for that reason will be described with specific reference to such application. The apparatus is susceptible of many other uses, for instance, in the filling of medical prescriptions requiring the intimate admixture of ingredients, and it is, therefore, to be understood that the invention is not to be restricted in its scope to any particular use or mode of application.

The primary object of the invention is to provide a mixing apparatus adapted particularly for medical and dental use, which is of very simple, inexpensive, compact and rugged construction, and which is capable of preparing exceedingly intimate mixtures in a minimum amount of time with minimum effort.

Another important object is to provide a device for proportioning two ingredients in a predetermined ratio and for mixing the proportioned material in one continuous operation, thus obviating the necessity for manually transferring the proportioned material to the mixing part of the device.

A further object of importance is to provide a highly effective device for automatically proportioning two materials, which are to be intimately admixed for medical or dental use.

Still another important object is to provide a mixing device particularly suitable for preparing dental amalgams in condition for use in filling teeth.

Referring briefly to the drawings, wherein I have for illustrative purposes shown the presently preferred embodiment of the invention:

Figure 1:
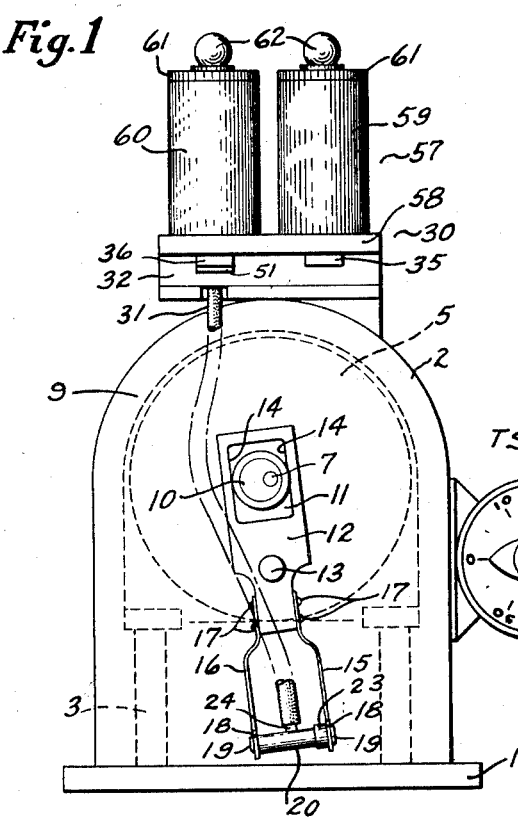
Figure 1 is a front elevation of the combined proportioner and mixing apparatus.

Referring to the drawings in greater detail, it will be noted that the reference numeral 1 denotes a base member of generally rectangular shape. Mounted on the base is a casing or housing 2. Also mounted on the base within the casing are a plurality of vertically disposed coil springs 3, which may advantageously be secured to the base by means of studs 4. These springs serve to support a high speed motor 5. The base of the motor is provided with studs 6, which extend into the upper ends of the springs 3. The studs 4 and 6 fit snugly in the ends of the springs 3, thereby preventing relative movements of the springs and studs and serving to provide a floating mounting for the motor.

The shaft of the motor, which is indicated by the numeral 7, extends through an aperture 8 in the front wall 9 of the housing 2, and has secured to the outer end an eccentric disk 10. The disk is received in a substantially rectangular aperture 11 in the upper end of a lever 12. The lever is pivotally mounted in the motor housing by means of a pin 13, which extends through an aperture in the front wall of the casing 2. The eccentric disk is in slidable contact with the vertical walls 14 of the aperture 11 in the lever, so that when the disk is rotated by the motor an oscillating motion is produced in the lever 12.

Figure 2:
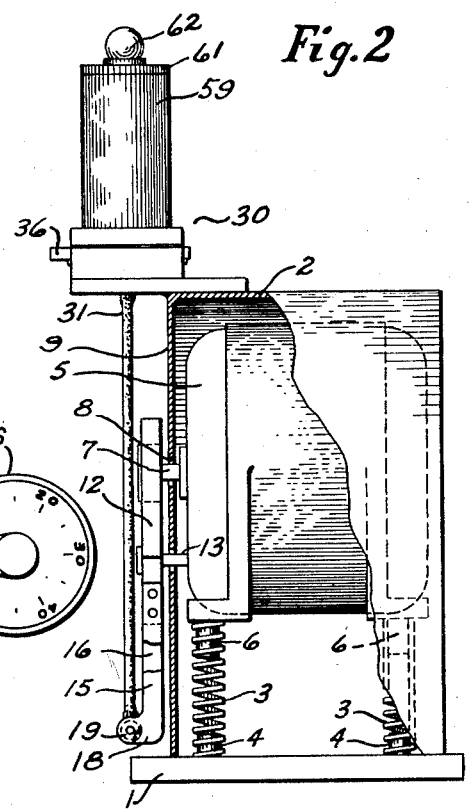
Figure 2 is a side elevation, part of the apparatus being broken away to reveal the inner construction.

Secured to the lower end of the lever 12 are two downwardly extending spring arms 15 and 16. They may be secured by means of rivets 17. Each of these spring arms is L-shaped, having as shown in Figure 2, a forwardly extending projection 18. Each projection 18 is preferably provided with a substantially hemispherical depression 19 for the purpose of receiving one end of the mortar capsule 20.

Figure 3:
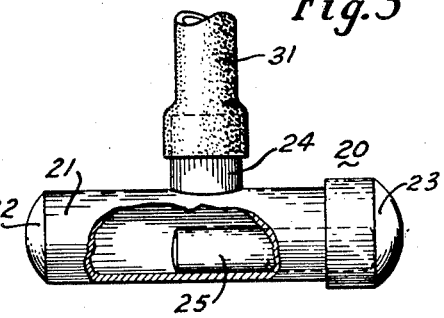
Figure 3 is a front elevation, on a somewhat larger scale, of the mortar capsule and associated elements, part of the capsule being broken away to reveal the pestle.
Figure 5:
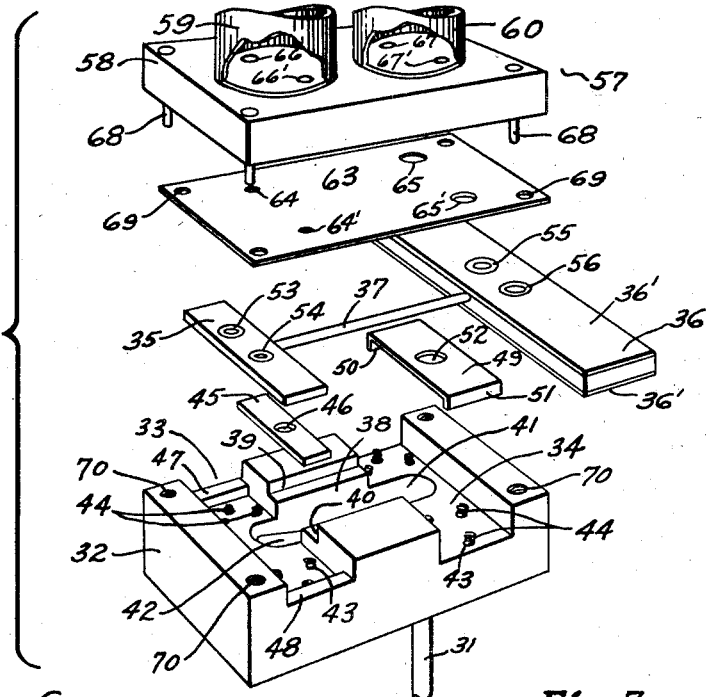
Figure 5 is an exploded rear view of the proportioning device of Figure 4.

The mortar capsule, shown on a somewhat enlarged scale in Figure 3, consists of a cylindrical member 21 closed at one end 22, and having a tightly fitting cap 23 for the opposite open end. The main body of the capsule is provided with a tubular side arm 24, through which it may be filled as will hereinafter be disclosed. The numeral 25 denotes a cylindrical metallic rod, which serves as the pestle.

The materials to be admixed in the mortar capsule are preferably fed into the capsule through the tubular side arm 24. This side arm is connected to the proportioning device 30 by means of a flexible tube 31. Part of the tube, preferably the upper part, may advantageously be of transparent glass or plastic material.

The proportioning device is mounted on the top of the casing 2, and advantageously overhangs the front wall 9 thereof. The reference 32 denotes the body portion, which is preferably of a suitable molded plastic material. The reference numerals 33 and 34 designate two parallel slots extending from the front to the rear and adapted to receive the proportioning slides 35 and 36 respectively. These slides are secured together by means of a tie rod 37. A communicating slot 38 is provided between the slots 33 and 34 so as to receive the tie rod 37 and to give it considerable freedom of movement. The slot 38 is formed with off-set surfaces 39 and 40 to provide stops for limiting the movement of the tie rod 37. A cavity 41, having an inclined bottom 42, forms a funnel beneath the two proportioning plungers 35 and 36 and the tie rod 37.

The floors of the two slots 33 and 34 are provided with a plurality of blind holes 43 for receiving compression springs 44. Received within the slot 33 is a pressure pad 45 of a suitable plastic material, unaffected by the action of mercury. This pad is provided with a central aperture 46 which communicates with the cavity 41. The recess 33 may be provided with retaining lips 47 and 48 to prevent movement of the pressure pad 45 when the slide 35 is moved.

Received within the slot 34 is a pressure pad 49 formed of metal particularly adapted to resist the abrasive action of powdered metal. This element has downwardly extending flanges 50, 51, which fit over the sides of body member 32, and serve to prevent relative movement thereof when the slide 36 is moved. The pad 49 is provided with an aperture 52, which communicates with the cavity 41.

The slide 35 has two removable insert bushings 53 and 54 having very carefully drilled inside diameters to provide space for a predetermined volume of material such as mercury. The slide 36 is made of plastic material with laminations of metal 36' to resist the abrasive action of powdered metal. It is similarly provided with insert bushings 55 and 56, having inside diameters to provide space for a predetermined volume of material, such as powdered metal mixtures or alloys especially prepared for dental use. By using insert bushings 53, 54 and 55, 56 having predetermined diameters, it is possible to obtain a predetermined accurate proportioning of ingredients by volume. Spare sets of bushings may be provided for use, when it is desired to change the relative proportions.

Figure 4:
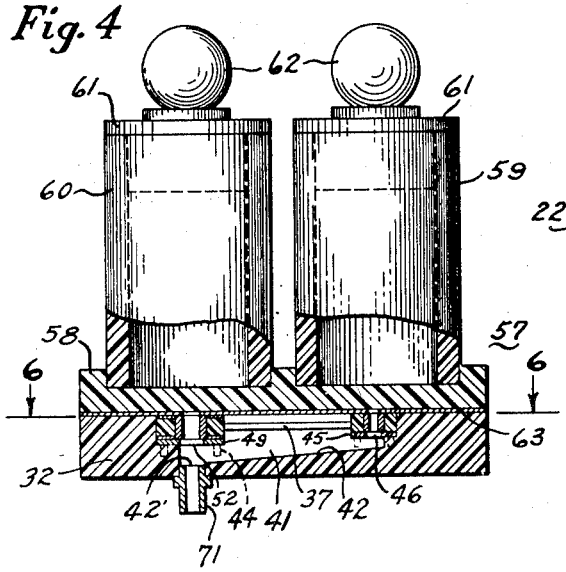
Figure 4 is a front elevation, on a somewhat larger scale, of the proportioning device.

The reference numeral 57 denotes the container portion of the proportioning device. This may be made of a single molded piece or may be constructed as shown in Figure 4 of a base 58 and two cylindrical tubes 59 and 60. Suitable stoppers 61 may be provided to exclude dirt and to prevent loss of material by splashing. The two tubes may well be made of a transparent material, and the stoppers may be provided with finger-holds 62. Interposed between the base 58 and the proportioning slides 35 and 36 is a friction plate 63. This plate is provided with the two sets of apertures 64, 64' and 65, 65'. Set 64, 64' is in registration with a similar set of holes 66, 66' in the base 58, and set 65, 65' is in registration with a similar set 67, 67'. The holes 66, 66' communicate with the tube 59, and the holes 67, 67' are in communication with the tube 60.

The proportioner is assembled as shown in Figure 4, the parts being held together by four screws 68 passing through base 58, through holes 69 in the friction plate 63 into tapped holes 70 in the body 32. It is to be noted that the distance between the two bushings 53 and 54 (55 and 56) is one half the distance between holes 64 and 64' (65 and 65'), that when the bushings 53, 55 are in registration with holes 64, 65 the bushings 54, 56 are in registration with the apertures 46, 52 in the pressure pads 45, 49, and that when the bushings 54, 56 are in registration with the apertures 64', 65', the bushings 53, 55 are in registration with holes 46, 52 in the pressure pads. This registration is brought about by the off-set surfaces 39 and 40.

Figure 6:
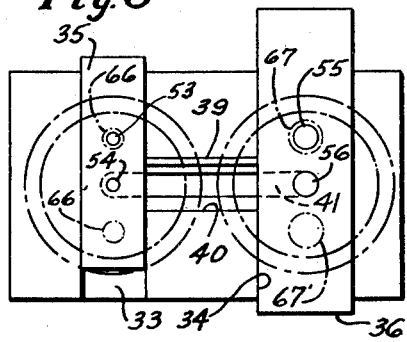
Figure 6 is a view taken on line 6—6 of Figure 4, showing one extreme position of the slides.
Figure 7:
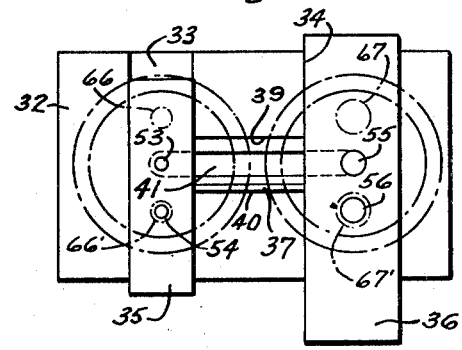
Figure 7 is a similar view showing the slides in the opposite position.

Figures 6 and 7 illustrate how the materials in the two tubes 59 and 60 are proportioned and then dispensed or fed from the proportioning device. Referring to Figure 6, it will be seen that when the slide 36 is pushed to the position shown, bushing 55 is brought into registration with the hole 65, communicating with the container tube 60. Similarly, because of the tie bar 37, bushing 53 of slide 35 is brought into registration with the aperture 64, communicating with the other container tube 59. The off-set surface 39 stops tie bar 37 in proper aligning position. Thus the respective bushings are filled with proportional amounts of material from the containers by gravity plus a vibrating action to be described hereinafter. Now by changing position of slide 36 to that shown in Figure 7, where tie bar 37 rests against off-set surface 40, bushing 55 with its contents is brought into alignment with communicating hole 52 of pressure pad 49, and the contents of bushing 55 are deposited into the funnel-like cavity 41. Similarly, slide 35 is moved because of its connection with plunger 36, bringing bushing 53 and its contents into registration with communicating hole 46 of the pressure pad 45, and causing the contents to drop into cavity 41. Thus are deposited two carefully predetermined volumes of material in a desired proportion into cavity 41. The material from the tube 59 drops directly through aperture 42' at the bottom of the inclined plane 42. The material from the tube 60 proceeds across inclined bottom 42 by gravity and moderate vibration described hereinafter, and falls through the aperture 42', whence both materials are conducted through nipple 71 to the flexible tube 31, and then to capsule 20 for admixture or amalgamation. Meanwhile, bushings 54 and 56 have automatically been brought into registration with other communicating holes 64' and 65', where they are charged with materials ready for deposit when the cycle is completed and slides are returned to position shown in Figure 6.

It will be understood that when the motor is operated, rapid oscillatory motion is imparted to lever 12, vigorously shaking mortar capsule 20 with its pestle 25, producing a thorough uniform amalgamation of the materials received from the proportioner. This action sets up considerable vibration in the electric motor 5. Much of this vibration is dampened by the supporting springs 3, but a moderate amount is transmitted to the base 1 and thereby conducted through the housing 2, which is directly mounted on said base to the proportioner 30. This mild vibration causes a uniform filling of the measuring bushings which have access to the holes 64, 64' and 65, 65' in the friction plate 63, and also causes complete emptying of the bushings which are aligned with the holes 46 and 52 in the pressure pads 44 and 49. If thought necessary or desirable, the two tubes 59 and 60 may be dampened against the vibration. Free vibration of the tube 31 renders certain that all the material is fed to the capsule 20. Thus, substantially uniformly identical amalgams are made, first by consistently measuring correct proportions of materials, second by assuring the use of all of the apportioned materials, and third, by vigorously shaking the materials in a confined space in conjunction with a pestle. Still greater uniformity may be attained by including a timing switch TS in the motor's electrical circuit, as indicated in Figure 1, so that identical controlled periods of vibration can be achieved. Current can be supplied from ordinary household wiring, using a standard plug-in connection (not shown).

It will be further understood that at the end of the mixing operation, the mortar capsule 20 may be removed from the spring arms and the outer end of the flexible tube 31, and emptied through the open end. It may be replaced for the mixing of another batch of material.

I claim:

1. In combination with a proportioning device and a mixing device, a flexible connection between said devices to convey a charge of proportioned material from said proportioning device to said mixing device, and means simultaneously to actuate said mixing device and to vibrate said flexible connection, whereby all of the proportioned material is conveyed to said mixing device and thoroughly mixed therein.

2. A device of the character described consisting of a proportioning device and a mixing device, said proportioning device being mounted above said mixing device, a flexible tube connecting said devices and serving to convey a charge of proportioned material to said mixing device, and means to actuate said mixing device and to vibrate said flexible tube, whereby all of the proportioned material is conveyed to said mixing device and thoroughly mixed therein.

3. A device of the character described consisting of a casing, a motor mounted on springs within said casing and having a shaft extending through a wall of said casing, a depending lever having its upper end secured eccentrically to said shaft, a mortar capsule secured to the lower end of said lever, a source of supply for the materials to be mixed mounted above said mortar capsule, and a flexible connection between said source of supply and said mortar capsule, the actuation of said motor serving to oscillate said lever and to vibrate said flexible connection.

4. A device of the character described consisting of a base, a lever pivoted at its upper end in said base and mounted for oscillation, a mortar capsule secured to the lower free end of said lever, a source of supply for material to be mixed positioned at a higher level than said mortar capsule, a flexible connection between said source and said capsule, and means simultaneously to vibrate said flexible connection and to oscillate said lever.

5. A device of the character described consisting of a casing, a motor mounted on springs within said casing and having a shaft extending through a wall of said casing, a depending lever having its upper end secured eccentrically to said shaft, a mortar capsule secured to the lower end of said lever, a source of supply for the materials to be mixed mounted on said casing, a flexible connection between said source of supply and said mortar capsule, and means to oscillate said lever and to agitate the contents of the mortar capsule.

6. A device of the character described consisting of a proportioning device and a mixing device, the mixing device being provided with a casing, and the proportioning device being mounted on said casing, a flexible tube connecting said proportioning and mixing devices and serving to convey a charge of proportioned material from said proportioning device to said mixing device, and means to actuate said mixing device and to vibrate said flexible tube, whereby all of the proportioned material is conveyed to said mixing device and thoroughly mixed therein.

JOHN J. CURRY.

REFERENCES CITED

The following references are of record in the file of this patent:

UNITED STATES PATENTS

| Number | Name | Date |
|---|---|---|
| 193,090 | Jenne et al. | July 17, 1877 |
| 1,356,731 | Muchow | Oct. 26, 1920 |
| 1,605,832 | Garhart | Nov. 2, 1926 |
| 1,747,378 | McClure | Feb. 18, 1930 |
| 1,758,999 | Carns | May 20, 1930 |
| 1,774,954 | Voight | Sept. 2, 1930 |
| 1,980,057 | Harkair | Nov. 6, 1934 |
| 2,151,123 | Lavine | Mar. 21, 1939 |
| 2,450,885 | Erdle | Oct. 12, 1948 |